US00RE48320E

(19) United States
(12) Reissued Patent
Gieg et al.

(10) Patent Number: US RE48,320 E
(45) Date of Reissued Patent: Nov. 24, 2020

(54) GAS TURBINE

(71) Applicant: MTU Aero Engines AG, Munich (DE)

(72) Inventors: Walter Gieg, Eichenau (DE); Petra Kufner, Poing (DE); Rudolf Stanka, Rattenkirchen (DE)

(73) Assignee: MTU Aero Engines AG, Munich (DE)

(21) Appl. No.: 16/191,706

(22) Filed: Nov. 15, 2018

Related U.S. Patent Documents

Reissue of:

(64) Patent No.: 9,822,657
Issued: Nov. 21, 2017
Appl. No.: 14/584,867
Filed: Dec. 29, 2014

(30) Foreign Application Priority Data

Jan. 9, 2014 (EP) ..... 14150518

(51) Int. Cl.
*F01D 11/08* (2006.01)
*F01D 11/12* (2006.01)
*F01D 25/24* (2006.01)

(52) U.S. Cl.
CPC ..... *F01D 11/08* (2013.01); *F01D 11/12* (2013.01); *F01D 11/122* (2013.01); *F01D 25/24* (2013.01);
(Continued)

(58) Field of Classification Search
CPC ..... F01D 11/08; F01D 11/12; F01D 11/122; F01D 25/24; F05D 2240/11;
(Continued)

(56) References Cited

U.S. PATENT DOCUMENTS 4,053,254 A * 10/1977 Chaplin et al. ..... F01D 11/08 415/116
4,650,394 A * 3/1987 Weidner ..... F01D 11/08 415/115
(Continued)

FOREIGN PATENT DOCUMENTS

DE 60122083 T2 3/2007
EP 0844369 A1 5/1998
FR 2891583 A1 * 4/2007 ..... F01D 11/12

OTHER PUBLICATIONS

English translation of FR-2891583-A1 retrieved from the Espacenet patent search website of the European Patent Office:<http://translationportal.epo.org/emtp/translate/?ACTION=description-retrieval&COUNTRY=FR&ENGINE=google&FORMAT= docdb &KIND=A1&LOCALE=en_EP&NUMBER=2891583&OPS=ops.epo.org/3.2&SRCLANG=fr&TRGLANG=en>.*

*Primary Examiner* — Peter C English
(74) *Attorney, Agent, or Firm* — Barlow, Josephs & Holmes, Ltd.

(57) ABSTRACT

The aircraft-engine gas turbine includes an outer sealing ring for sealing an array of rotor blades that can be attached to a housing by a clamping mechanism (80) in a friction fit, and a plurality of ring segments (20$_i$, 20$_{1+1}$), wherein [a free axial path length ($a_f$) of a sealing ring segment counter to the direction of through-flow is at least as large as an axial engagement ($a_1$) of a rotation locking member (10) of the outer sealing ring ($a_f \geq a_1$), which is free of form fit counter to the direction of through-flow, and/or an axial overhang ($a_2$) of a radial mounting rail (23) of the outer sealing ring ($a_f \geq a_2$), and/or an axial offset ($a_3$, $a_4$) of a sealing fin (31, 41); and/or] a quotient of a specific clearance sum of the outer sealing ring attached to the housing in a friction fit *and pi is at least as large as a difference between a maximum outer diameter of the outer sealing ring and a minimum inner diameter of the flow channel inlet of the housing.*

8 Claims, 1 Drawing Sheet

AMENDED

(52) U.S. Cl.
CPC .. *F05D 2200/11* (2013.01); *F05D 2220/3212* (2013.01); *F05D 2230/60* (2013.01); *F05D 2230/70* (2013.01); *F05D 2240/11* (2013.01); *F05D 2260/36* (2013.01); *F05D 2260/37* (2013.01)

(58) Field of Classification Search
CPC ..... F05D 2240/55; F05D 2260/36; F05D 2260/37; F05D 2200/11; F05D 2200/14; F05D 2200/33; F05D 2220/3212; F05D 2220/3217; F05D 2230/60; F05D 2230/70; F02C 7/28
See application file for complete search history.

(56) References Cited

U.S. PATENT DOCUMENTS 7,186,078 B2 * 3/2007 Tanaka ..... F01D 5/225 415/170.1
2007/0231132 A1 10/2007 Durand

* cited by examiner

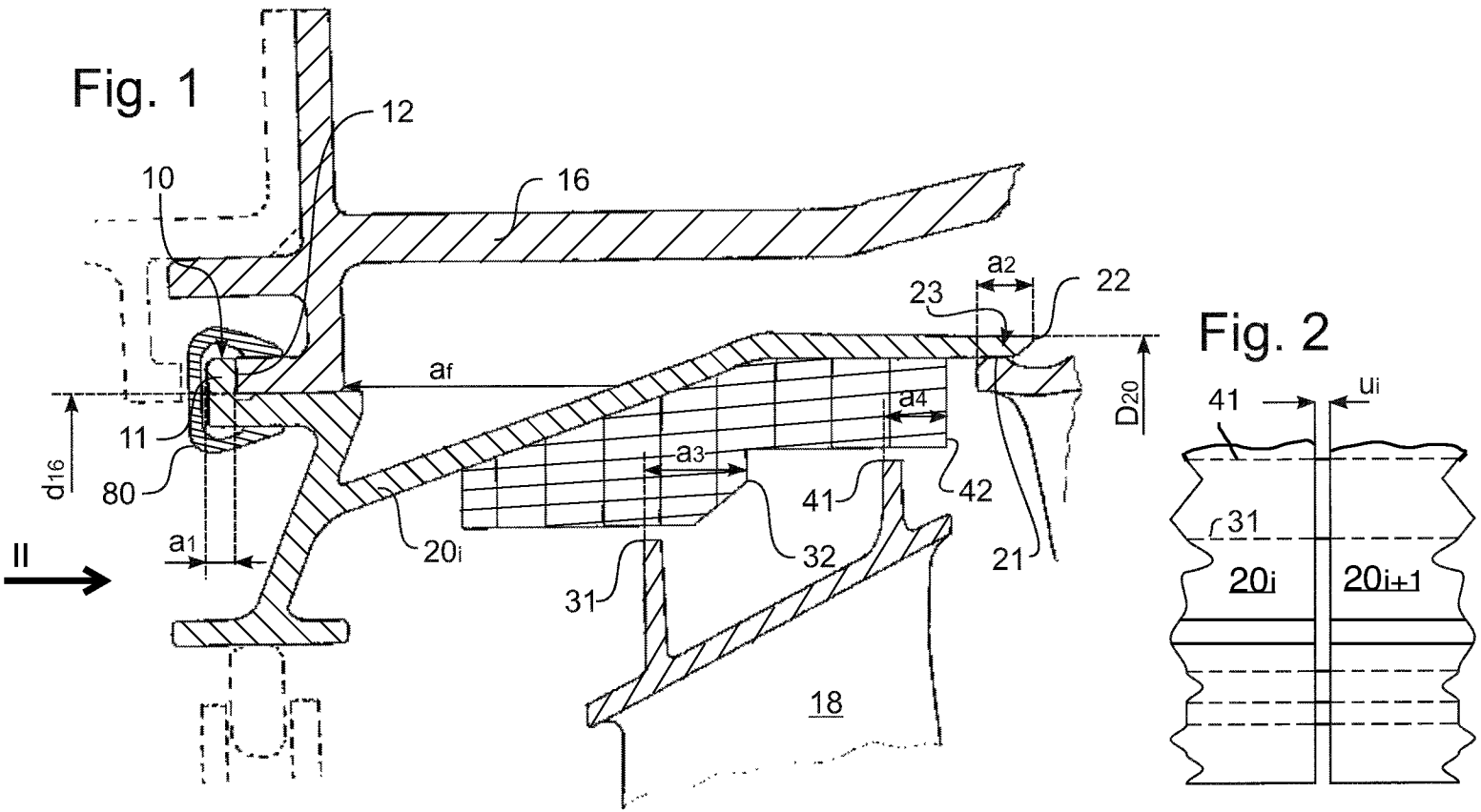
AMENDED
AMENDED

GAS TURBINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue of U.S. Pat. No. 9,822,657, which issued from application Ser. No. 14/584,867 filed on Dec. 29, 2014, which claims priority to European Application No. 14150518, filed on Jan. 9, 2014.*

BACKGROUND OF THE INVENTION

The present invention relates to a gas turbine, in particular an aircraft-engine gas turbine, having a housing, an array of rotor blades, and a segmented outer sealing ring for sealing this array of rotor blades, which can be attached to the housing by a clamping mechanism in a friction fit, as well as a method for mounting and/or dismounting the array of rotor blades in the housing.

Known from US 2007/0231132 A1 is a gas turbine having a housing, an array of rotor blades, and a segmented outer sealing ring for sealing this array of rotor blades, which is attached to the housing by a clamping mechanism in a friction fit.

Usually, during mounting, such arrays of rotor blades are inserted counter to the direction of through-flow or from the rear into the flow channel, because the flow channel diverges in the direction of through-flow and thus its diameter correspondingly increases, and the arrays of rotor blades are then fixed in place in the flow channel. Accordingly, in order to dismount the first array of rotor blades in the direction of through-flow, it is necessary first of all to dismount all of the following arrays of rotor blades. On the other hand, the first array of rotor blades in the direction of through-flow has to be serviced very frequently due to thermomechanical loads and, for this purpose, has to be dismounted and mounted (back) in the housing.

SUMMARY OF THE INVENTION

An object of an embodiment of the present invention is to improve the mounting and/or dismounting of an array of rotor blades of a gas turbine, in particular a first array of rotor blades, in the direction of through-flow.

This object is achieved by a gas turbine of the present invention. The present invention also provides a method for dismounting and mounting an array of rotor blades of a corresponding gas turbine. Advantageous embodiments of the invention are also disclosed.

According to an aspect of the present invention, a gas turbine, in particular an aircraft-engine gas turbine has a one-part or multi-part housing with a flow channel inlet, which, in particular, is at least substantially circular, and a downstream flow channel outlet. In one embodiment, a flow channel diverges between the flow channel inlet and outlet, particularly owing to the increasing depressurization of the operating medium when it flows through the flow channel. Accordingly, in one embodiment, the flow channel outlet has a larger inner diameter than the flow channel inlet.

At least one array of rotor blades can be arranged and, in particular, is arranged in the flow channel, particularly in an axially rigid manner, and is preferably set up so as to convert the flow energy into mechanical work. In one embodiment, a plurality of arrays of rotor blades that are spaced apart from one another can be arranged and, in particular, are arranged in the flow channel, particularly in an axially rigid manner, the outer diameter of said arrays of rotor blades preferably increasing in the direction of through-flow. The array or arrays of rotor blades can be joined to a rotor of the gas turbine detachably or permanently.

An outer sealing ring for sealing this array of rotor blades can be arranged and, in particular, is arranged radially between the housing and at least one of said arrays of rotor blades, particularly a first or frontmost array of rotor blades in the direction of through-flow, which can be arranged and, in particular, is arranged in the housing, particularly in an axially rigid manner.

The outer sealing ring can be attached and, in particular, is attached to the housing by a one-part or multi-part clamping mechanism in a friction fit and has a plurality of ring segments; in particular, it can be composed of or is made up of the plurality of ring segments. In one embodiment, the clamping mechanism has a cross section with a first leg that is supported against the housing, and a second leg that is supported on the outer sealing ring and clamps the latter radially against the housing with elastic deformation of the clamping mechanism, thereby attaching it to the housing in a friction fit. In one embodiment, the clamping mechanism has one or more C- or U-clips. In particular, one position of the outer sealing ring, when it is attached to the housing by the clamping mechanism, is referred to here as its operating position. In general, an operating position refers particularly to a position of components when the gas turbine is ready for operation and, in particular, when it is in operation.

According to one aspect of the present invention, the clamping mechanism or the frictionally engaged attachment by the clamping mechanism is first of all released when the array of rotor blades is to be dismounted. If the clamping mechanism has a multi-part construction, one or more and, in particular, all of the parts, particularly the C- or U-clips, are released.

Particularly in the case of an axially rigid array of rotor blades that remains in the operating position, the sealing ring segments of the outer sealing ring are then withdrawn from the housing through the flow channel inlet counter to the direction of through-flow before the array of rotor blades is next withdrawn from the housing through the flow channel inlet counter to the direction of through-flow. In one embodiment, two or more and, in particular, all sealing ring segments of the outer sealing ring are withdrawn together from the housing; in another embodiment, they are withdrawn in groups or one by one or in succession.

In this way, according to one aspect of the present invention, an array of rotor blades, in particular a first array of rotor blades in the direction of through-flow, can be dismounted, in particular, without prior dismounting of downstream annular arrays of rotor blades. Preferably, for this purpose, a maximum outer diameter and/or an outer contour of the array of rotor blades is at most as large as a minimum inner diameter or an inner contour of the flow channel inlet.

In one embodiment, the maximum outer diameter and/or circumference of the outer sealing ring attached to the housing in a friction fit, or the maximum outer diameter and/or circumference of the outer sealing ring, when it is attached to the housing in a friction fit, is larger than the minimum inner diameter or circumference of the flow channel inlet. According to one aspect of the present invention, such an outer sealing ring is also withdrawn from the housing through the flow channel inlet counter to the direction of though-flow, preferably while the axially rigid array of rotor blades is still in its operating position or without prior axial displacement of the array of rotor blades in the direction of through-flow.

For this purpose, according to one aspect of the present invention, one or more sealing ring segments are displaced radially inward, after release of the clamping mechanism, until the maximum outer diameter thereof is at most as large as the minimum inner diameter of the flow channel inlet. In the present case, a (maximum) radial distance of a radially peripheral outer contour from an axis of rotation of the gas turbine is particularly understood to be the (maximum) outer diameter. Accordingly, a displacement of a sealing ring segment radially inward or toward the axis of rotation reduces the (maximum) outer diameter of this sealing ring segment; a displacement of the sealing ring segment of the outer sealing ring radially inward correspondingly reduces the (maximum) outer diameter or circumference of the outer sealing ring.

In particular, according to one aspect of the present invention, in order to enable such a radial displacement of sealing ring segments or such a radial compression of the outer sealing ring, a quotient of a sum of the gap dimensions between the sealing ring segments attached to the housing in a friction fit in the operating position, or a clearance sum of the outer sealing ring attached to the housing in a friction fit in the operating position, and pi ($\pi$) is at least as large as a difference between a maximum outer diameter of the outer sealing ring, attached to the housing in a friction fit in the operating position, and a minimum inner diameter of the flow channel inlet:

$$\frac{\sum_{i=1}^{n} u_i}{\pi} \geq (D_{20} - d_{16})$$

where:

n: number of sealing ring segments of the outer sealing ring;

$u_i$: clearance or gap dimension between the i-th sealing ring segment and the adjacent sealing ring segment in the peripheral direction in the operating position [or] for the outer sealing ring attached to the housing by the clamping mechanism in a friction fit;

$$\sum_{i=1}^{n} u_i:$$

clearance sum or sum of the gap dimensions of the sealing ring segments of the outer sealing ring;

$$\frac{\sum_{i=1}^{n} u_i}{\pi}:$$

quotient of the clearance sum and pi;

[$D_{20} \cdot \pi$] $D_{20}$: maximum outer diameter of the outer sealing ring attached to the housing in a friction fit;

[$d_{16} \cdot \pi$] $d_{16}$: minimum inner diameter of the flow channel inlet.

In other words, the gaps between the sealing ring segments of the outer sealing ring attached to the housing in the operating position are at least sufficiently large enough that they permit the sealing ring segments to be pressed together until the outer sealing ring that has been radially compressed in this way has a sufficiently small outer diameter to allow it to be withdrawn from the flow channel inlet.

In particular, according to one aspect of the present invention, in order to provide sufficient radial play for such a radial displacement or compression, preferably without prior axial displacement of the array of rotor blades in the direction of through-flow, or in the case of an array of rotor blades arranged in the operating position, one or more sealing ring segments are initially displaced axially counter to the direction of through-flow after release of the clamping mechanism.

In particular, for this purpose, the sealing ring segments have a free axial path length counter to the direction of through-flow. A free axial path length of a sealing ring segment counter to the direction of through-flow is understood in the present case to be, in particular, the axial path by which the sealing ring segment can be displaced from its operating position after release of the clamping mechanism in a purely axial direction counter to the direction of through-flow until it comes into contact with the housing in a friction fit or until the housing prevents any further, purely axial displacement counter to the direction of through-flow in a friction fit. In other words, a free axial path length of a sealing ring segment counter to the direction of through-flow corresponds to an axial play of the sealing ring segment after release of the clamping mechanism counter to the direction of through-flow or to an axial gap in the operating position between a contact line of the housing and a contact line of the sealing ring segment, along which the sealing ring segment and the housing come into contact with each other when the sealing ring segment is displaced from the operating position in a purely axial direction counter to the direction of through-flow after release of the clamping mechanism.

According to one aspect of the present invention, the gas turbine has a rotation [locking member] *lock*, which prevents rotation [counter to the direction of through-flow, in a non-form-fitting manner,] between the outer sealing ring and the housing. In particular, it is then possible for one or more and, in particular, all of the sealing ring segments to be initially displaced axially counter to the direction of through-flow, particularly in succession, in groups, or all together, after release of the clamping mechanism, at least so far that this rotation [locking member] *lock* reaches a position of disengagement or is disengaged between the outer sealing ring and the housing.

In particular, for this purpose, according to one aspect of the present invention, the free axial path length of one or more and, in particular, all sealing ring segments counter to the direction of through-flow is at least as large as an axial engagement of the rotation [locking member] *lock*. An axial engagement of a rotation [locking member] *lock*, which prevents rotation [counter to the direction of through-flow in a non-fitting manner] *between the outer sealing ring and the housing*, is understood in the present case to refer to the axial path by which the sealing ring segment must be displaced until the rotation [locking member] *lock* also reaches a position of disengagement or is disengaged in the peripheral direction as well.

In one embodiment, the rotation [locking member] *lock* has an arrangement of grooves with one or more axial grooves in the housing distributed over the periphery, these grooves being open counter to the direction of through-flow and in each of which a radial flange of the outer sealing ring engages in the peripheral direction in a form-fitting manner when said flange is attached to the housing in a friction fit in the operating position. The free axial path length of one or more and, in particular, all of the sealing ring segments counter to the direction of through-flow is then at least as large as a maximum groove length of this groove arrangement. Because the maximum groove length limits the maximum axial engagement, it is thus possible advantageously, regardless of the axial cross section of the radial flange, to ensure a sufficient free axial path length in order to disengage said flange.

According to one aspect of the present invention, the gas turbine has a radial mounting rail of the outer sealing ring on or in the housing. In particular, it is then possible for one or more and, in particular, all of the sealing ring segments to be displaced, after release of the clamping mechanism, in particular in succession, in groups, or all together, initially counter to the direction of through-flow, at least so far that the radial mounting rail reaches a position of disengagement or is disengaged.

In one embodiment, the radial mounting rail has an inner surface of the outer sealing ring, which axially engages an outer surface of the housing from radially outside when the outer sealing ring is attached to the housing in a friction fit in the operating position. In particular, the outer sealing ring can have an axial flange, which engages axially over or radially behind a corresponding radial groove in the housing, in particular in a following array of rotor blades, when the outer sealing ring is attached to the housing in a friction fit in the operating position. The axial length on which the outer sealing ring engages axially over or radially behind the housing is referred to in the present case as an axial overhang of the radial mounting rail. Accordingly, in one embodiment, the free axial path length of one or more and, in particular, all of the sealing ring segments counter to the direction of through-flow is at least as large as an axial overhang of the radial mounting rail of the outer sealing ring. In particular, it is possible in this way to ensure a sufficient free axial path length in order to disengage the radial mounting rail of the outer sealing ring and thus radially compress the outer sealing ring.

According to one aspect of the present invention, the array of rotor blades has one or more sealing fins or preferably annular radial flanges, which project radially outward from an outer shroud of the array of rotor blades and lie radially opposite sealing faces of the sealing ring segment. In the operating position, such sealing fins can be displaced axially with respect to a downstream edge of a sealing face for sealing of these sealing fins counter to the direction of through-flow. In other words, the sealing fin can be arranged upstream in front of the downstream edge of the sealing face in the operating position, so that the sealing fin can oppose any radial compression of the outer sealing ring.

In particular, therefore, according to one aspect of the present invention, the free axial path length of one or more and, in particular, all of the sealing ring segments counter to the direction of through-flow is at least as large as an axial offset of a sealing fin [of the outer sealing ring] counter to the direction of through-flow, in particular its upstream, radially outer edge, with respect to a downstream edge of a sealing face of the sealing ring segment for sealing of this sealing fin. In one embodiment, [the sealing face in the downstream edge transitions into a preferably, at least substantially, radial front side, so that, in one embodiment,] the free axial path length of one or more and, in particular, all of the sealing ring segments counter to the direction of through-flow is at least as large as an axial offset of a sealing fin [of the outer sealing ring counter to the direction of through-flow, in particular its upstream radially outer edge,] with respect to a downstream [front side, which abuts a sealing face for sealing of this] *edge of a* sealing [fin and] *face. The sealing fin* extends preferably, at least substantially, radially.

[If] *In one embodiment,* the array of rotor blades has a first *sealing fin* and a second sealing fin, which is axially spaced from the first sealing fin, and the stepped outer sealing ring has a first sealing face for sealing of the first sealing fin and a second sealing face for sealing of the second sealing fin. [which] *The second sealing face* is spaced radially and axially from the first sealing face[, then, in one]. *In such an* embodiment, the free axial path length of one or more and, in particular, all of the sealing ring segments, counter to the direction of through-flow is at least as large as an axial offset of the first sealing fin, in particular [its radial outer] *at the* upstream edge, with respect to a downstream edge of the first sealing [side and/or a particularly at least substantially radial front side that abuts it, and additionally] *face. Further, in such an embodiment, the free axial path length of one or more and, in particular, all of the sealing ring segments* is at least as large as an axial offset of the second sealing fin, in particular [its radially outer] *at the* upstream edge with respect to a downstream edge of [a] *the* second sealing face[and/or particularly, at least substantially, a radial front side that abuts thereto].

In particular, it is possible in this way to displace one or more and, in particular, all of the sealing ring segments, after release of the clamping mechanism, in particular in succession, in groups, or all together, initially axially counter to the direction of through-flow at least so far that the sealing fin(s) is or are arranged downstream behind or after the downstream edge of the respective sealing face, opposite to which the sealing fin lies radially in the operating position. In this way, it is possible to provide sufficient radial play for a radial displacement or compression so as to withdraw the radially compressed outer sealing ring with radially inward displaced sealing ring segments from the flow channel inlet counter to the direction of through-flow.

The axial and radial displacements described above can be performed in succession at least in segments. In particular, the sealing ring segments of the outer sealing ring can be displaced in succession, in groups, or all together initially, at least substantially, purely axially counter to the direction of through-flow until, in particular, a rotation [locking member] *lock* and/or a radial mounting rail reaches a position of disengagement and/or sealing fins are arranged downstream behind their sealing faces and, subsequently, can be displaced, at least substantially, purely radially inward until their maximum outer diameter is at most still as large as the minimum inner diameter of the flow channel inlet and, subsequently, are displaced [by them] out of the housing, at least substantially, purely axially counter to the direction of through-flow.

Likewise, the axial and radial displacements described above can be performed in parallel or overlapped, at least in segments. In particular, the sealing ring segments of the outer sealing ring can be displaced in succession, in groups, or all together radially inward and, at the same time, axially counter to the direction of through-flow.

In one embodiment, one or more and, in particular, all of the sealing ring segments are displaced, at least substantially, axially and/or radially without any tilt, and/or withdrawn from the flow channel inlet. In the present case, this is particularly understood to mean that, during this dismounting, an upstream edge of a sealing ring segment is not moved, at least substantially, further radially inward or outward than a downstream edge of this sealing ring segment. In this way in particular, handling can be facilitated.

According to one aspect of the present invention, mounting of the array of rotor blades is analogously performed, at least substantially, in reverse sequence. In particular, the array of rotor blades can be inserted initially into the housing in the direction of through-flow through the flow channel inlet and preferably held axially in the operating position. Afterwards, the sealing ring segments of the outer sealing ring are inserted, preferably one by one, in groups, or all together, into the housing in the direction of through-flow through the flow channel inlet, before, subsequently, the outer sealing ring is attached to the housing with the clamping mechanism or the latter is attached to the housing in a friction fit.

In one embodiment, the sealing ring segments of the outer sealing ring are displaced, preferably one by one, in groups, or all together, prior to the fastening of the clamping mechanism, radially outward, in particular without any tilt, into their operating position, in which their maximum outer diameter is greater than the minimum inner diameter of the flow channel inlet, and are displaced, at least in segments, parallel thereto or in succession axially in the direction of through-flow until the rotation [locking member] *lock* and/or radial mounting rail is engaged and/or one or more and, in particular, all of the sealing fins are offset with respect to the downstream edge of the respective sealing face counter to the direction of through-flow.

BRIEF DESCRIPTION OF THE DRAWING FIGURES

Additional advantageous enhancements of the present invention ensue from the dependent claims and the following description of preferred embodiments. Shown, in part schematically, for this purpose are:

FIG. 1 a part of a gas turbine according to an embodiment of the present invention in an axial section along an axis of rotation; and FIG. 2 a part of the gas turbine according to FIG. 1 in a plan view indicated by II.

DESCRIPTION OF THE INVENTION

FIG. 1 shows, in a manner similar to FIG. 2 of US 2007/0231132 A1, mentioned in the beginning, a part of a gas turbine according to an embodiment of the present invention in an axial section along a horizontal axis of rotation. Additional reference to US 2007/0231132 A1 is made; in particular, elements corresponding to each other are identified by identical reference numbers, so that, in the following, differences will be particularly addressed.

The gas turbine has a housing 16 with a circular flow channel inlet, the minimum inner diameter of which is indicated by $d_{16}$.

In an operating position illustrated in FIGS. 1[,] *and* 2, a first array of rotor blades 18 is arranged in the direction of through-flow (from left to right in FIG. 1) in the flow channel. Interposed radially between the housing and the array of rotor blades is an outer sealing ring for sealing of this array of rotor blades, said outer sealing ring being attached to the housing through a clamping mechanism 80 in the form of a plurality of C-clips in a friction fit, and having a plurality of ring segments $\mathbf{20}_i$, $\mathbf{20}_{i+1}$, . . . , which are spaced apart from each other by the clearance $u_i$ in the peripheral direction (see FIG. 2).

The sealing ring segments have a free axial path length $a_f$, which is indicated by an arrow in FIG. 1, counter to the direction of through-flow. After the C-clips have been released, the sealing ring segments can be displaced purely axially by [at] *length* $a_f$ counter to the direction of through-flow until the housing limits any further, purely axial displacement counter to the direction of through-flow.

The free axial path length $a_f$ is larger than an axial engagement $a_1$ of a rotation [locking member] *lock* 10 of the outer sealing ring [counter to the direction of through-flow in a manner free of form fit] *assembly*. The rotation [locking member] *lock 10* has a groove arrangement with a plurality of open axial grooves 12 in the housing *open* counter to the direction of through-flow (toward the left in FIG. 1), in which [a] radial [flange] *flanges* 11 of the outer sealing ring, attached to the housing in a friction fit, [engages] *engage* in the peripheral direction in a form-fitting manner. The maximum groove length $a_1$ of the groove arrangement can correspond, at least substantially, to the axial engagement of the rotation [locking member] *lock*.

The free axial path length $a_f$ is, at the same time, greater than an [axial] overhang $a_2$ of a radial mounting rail 23 of the outer sealing ring. The axial overhang $a_2$ is defined by the axial length $a_2$ on which an axial flange 22 of the outer sealing ring engages over a radial groove 21 of the housing in the axial direction (horizontal in FIG. 1)[or engages behind it in the radial direction (vertical in FIG. 1)]. [The radial groove of the housing is indicated by an array of rotor blades, which is shown rudimentally in FIG. 1.]

The array of rotor blades has a first sealing fin 31 and a second sealing fin 41, which is spaced apart axially from the first sealing fin. The outer sealing ring, which is insofar stepped, has a first[, bent] sealing face for sealing the first sealing fin and a second[, straight] sealing face for sealing the second sealing fin, which is spaced apart axially and radially from the first sealing face.

The free axial path length $a_f$ is also larger than an axial offset $a_3$ of the first sealing fin with respect to a downstream edge 32 of the first sealing face and larger than an axial offset $a_4$ of the second sealing fin with respect to a downstream edge 42 of the second sealing face.

A quotient of a clearance sum of the outer sealing ring attached to the housing in a friction fit in the operating position and pi ($\pi$) is greater than or equal to the difference between the maximum outer diameter $D_{20}$ of the outer sealing ring, attached to the housing in a friction fit in the operating position, and the minimum inner diameter $d_{16}$ of the flow channel inlet:

$$\frac{\sum_{i=1}^{n} u_i}{\pi} \geq (D_{20} - d_{16})$$

where, in the operating position, the maximum outer diameter of the outer sealing ring is larger than the minimum inner diameter of the flow channel inlet.

For dismounting the array of rotor blades, initially one or more and preferably all C-clips of the clamping mechanism 80 are released.

Afterwards, the sealing ring segments $\mathbf{20}_i$, $\mathbf{20}_{i+1}$, . . . of the outer sealing ring are withdrawn from the housing 16 one by one, in groups, or all together through the flow channel inlet counter to the direction of through-flow.

For this purpose, the sealing ring segments are displaced, after release of the clamping mechanism 80, axially, without any tilt, counter to the direction of through-flow until the rotation [locking member] *lock* 10 and the radial mounting rail 23 are disengaged and the sealing fins 31, 41 are arranged downstream [after] *from* the edges 32 and 42, respectively, of the respective sealing faces (at the right in FIG. 1).

Afterwards, the sealing ring segments $\mathbf{20}_i$, $\mathbf{20}_{i+1}$, . . . of the outer sealing ring are displaced one by one, in groups, or all together radially inward until their maximum outer diameter is as large as or smaller than the minimum inner diameter $d_{16}$ of the flow channel inlet. This is possible owing to the clearance sum. If $D'_{20}$ indicates the maximum outer diameter of the radially compressed outer sealing ring with radially inward displaced sealing ring segments, so that the latter abut one another in the peripheral direction or their clearance sum is equal to zero, then the following holds:

$$(D_{20} - D'_{20}) \cdot \pi = \sum_{i=1}^{n} u_i \geq (D_{20} - d_{16}) \cdot \pi \Rightarrow D'_{20} \leq d_{16}$$

that is, the compressed outer diameter $D'_{20}$ is smaller than *or equal to* the inner diameter $d_{16}$ of the flow channel inlet. Accordingly, the sealing ring segments $\mathbf{20}_i$, $\mathbf{20}_{i+1}$, . . . of the outer sealing ring can be displaced one by one, in groups, or all together further axially counter to the direction of through-flow and thus withdrawn from the housing 16 through the flow channel inlet.

Afterwards, the array of rotor blades 18 is withdrawn from the housing through the flow channel inlet counter to the direction of through-flow.

The mounting is performed analogously in the reverse sequence: initially, the array of rotor blades is inserted into the housing in the direction of through-flow through the flow channel inlet and secured axially in the operating position. The sealing ring segments of the outer sealing ring can be then inserted into the housing in the direction of through-flow through the flow channel inlet.

For this purpose, the sealing ring segments of the radially compressed outer sealing ring are displaced or inserted one by one, in groups, or all together axially into the housing 16 in the direction of through-flow through the flow channel inlet. Afterwards, the sealing ring segments $\mathbf{20}_i$, $\mathbf{20}_{i+1}$, . . . of the outer sealing ring are displaced one by one, in groups, or all together radially outward until they rest radially against the housing. They are then displaced further in the direction of through-flow into the operating position, in which the rotation [locking member] *lock* 10 and the radial mounting rail 23 are engaged and the sealing fins 31, 41 are arranged upstream in front of the edges 32 and 42 of the associated sealing faces. Finally, the clamping mechanism 80 and, therewith, the outer sealing ring are attached to the housing in a friction fit.

Even though, in the above description, exemplary embodiments have been described, it is noted that a large number of modifications are possible. In addition, it is noted that the exemplary embodiments merely involve examples that are in no way intended to limit the protective scope, the applications, and the construction. Instead, the person skilled in the art will be afforded a guideline for implementation of at least one of the exemplary embodiments by the above description, with it being possible to make diverse changes, in particular in regard to the function and arrangement of the components described, without departing from the protective scope, as ensues from the claims and combinations of features equivalent thereto.

What is claimed is:

1. An aircraft-engine gas turbine, having a housing that has a flow channel inlet, a first array of rotor blades in a direction of through-flow arranged in the housing, *and* an outer sealing ring for sealing the first array of rotor blades attached to the housing by a clamp in a friction fit, [and] *the outer sealing ring comprising* a plurality of ring segments; wherein a free axial path length of [each of] the [plurality of] *outer sealing* ring [segments] counter to the direction of through-flow is [at least as large as] *defined between a portion of the outer sealing ring and a portion of the housing, and* a quotient of a clearance sum $$\left(\sum_{i=1}^{n} u_i\right)$$

of the outer sealing ring attached to the housing in a friction fit and pi ($\pi$) is at least as large as a difference between a maximum outer diameter ($D_{20}$) of the outer sealing ring, attached to the housing in a friction fit, and a minimum inner diameter ($d_{16}$) of the flow channel inlet of the housing $$[\left(\sum_{i=1}^{n} u_i \geq (D_{20} - d_{16}) \cdot \pi\right)]$$

$$\left(\frac{\sum_{i=1}^{n} u_i}{\pi} \geq (D_{20} - d_{16})\right),$$

*wherein n is the number of the plurality of ring segments, and*

*wherein $u_i$ is a clearance or gap between adjacent ring segments of the plurality of ring segments in a peripheral direction.*

2. The aircraft-engine gas turbine according to claim 1, wherein a rotation [locking member] *lock* has [a groove arrangement with] at least one axial groove in the housing that is open counter to the direction of through-flow, in which a radial flange of the outer sealing ring attached to the housing in a friction fit engages in the peripheral direction in a form-fitting manner, and wherein the free axial path length of [each of] the [plurality of] *outer sealing* ring [segments] counter to the direction of through-flow is at least as large as a maximum groove length of the *at least one* groove[arrangement].

3. The aircraft-engine gas turbine according to claim 1, wherein the array of rotor blades has a first *sealing fin* and a second sealing fin, the second sealing fin is spaced apart axially from the first sealing fin, and the outer sealing ring has a first sealing face for sealing the first sealing fin and a second sealing face for sealing the second sealing fin, the second sealing face is spaced apart axially and radially from the first sealing face, and the free axial path length of [each of] the [plurality of] *outer sealing* ring [segments] counter to the direction of through-flow is at least as large as an axial offset of the first sealing fin with respect to a downstream edge of the first sealing face and at least as large as an axial offset of the second sealing fin with respect to a downstream edge of the second sealing face.

4. The aircraft-engine gas turbine according to claim 1, wherein the maximum outer diameter of the outer sealing ring attached to the housing in a friction fit is larger than the minimum inner diameter of the flow channel inlet.

5. The aircraft-engine gas turbine according to claim 1, wherein the array of rotor blades is configured and arranged to convert flow energy into mechanical work [and/or] *or* a flow channel outlet of the housing has a larger inner diameter than the flow channel inlet of the housing.

[6. A method for dismounting an array of rotor blades of a gas turbine, comprising the steps of:

providing a housing that has a flow channel inlet, a first array of rotor blades in a direction of through-flow arranged in the housing, an outer sealing ring for sealing the first array of rotor blades attached to the housing by a clamp in a friction fit, and a plurality of ring segments; wherein a free axial path length of each of the plurality of ring segments counter to the direction of through-flow is at least as large as a quotient of a clearance sum $$\left(\sum_{i=1}^{n} u_i\right)$$

of the outer sealing ring attached to the housing in a friction fit and pi ($\pi$) is at least as large as a difference between a maximum outer diameter of the outer sealing ring, attached to the housing in a friction fit, and a minimum inner diameter of the flow channel inlet of the housing $$\left(\sum_{i=1}^{n} u_i \geq (D_{20} - d_{16}) \cdot \pi\right);$$

releasing the clamp;

withdrawing the plurality of ring segments of the outer sealing ring, as a whole set, from the housing counter to the direction of through-flow through the flow channel inlet; and withdrawing the first array of rotor blades from the housing counter to the direction of through-flow through the flow channel inlet.]

[7. The method according to claim 6, further comprising the steps of:

displacing the plurality of ring segments after release of the clamp, without any tilt and/or all together, axially counter to the direction of through-flow until a rotation locking member and/or a radial mounting rail is disengaged and/or a sealing fin is arranged downstream of a downstream edge; and/or displacing the plurality of ring segments radially inward until the maximum outer diameter is at most as large as the minimum inner diameter of the flow channel inlet.]

[8. The method according to claim 6, further comprising the steps of:

inserting the first array of rotor blades into the housing in the direction of through-flow through the flow channel inlet;

inserting the plurality of ring segments of the outer sealing ring into the housing in the direction of through-flow through the flow channel inlet; and attaching the clamp to the outer sealing ring.]

[9. The method according to claim 8, wherein the plurality of ring segments are displaced, prior to the attachment of the clamp, without any tilt and/or all together, axially in the direction of through-flow until a rotation locking member and/or a radial mounting rail is engaged and/or a sealing fin is displaced with respect to an edge counter to the direction of through-flow; and/or are displaced radially outward until the maximum outer diameter is larger than the minimum inner diameter of the flow channel inlet.]

10. The aircraft-engine gas turbine according to claim 1, wherein the free axial path length of [each of] the [plurality of] *outer sealing* ring [segments] counter to the direction of through-flow is at least as large as an axial engagement of a rotation [locking member of] *lock between* the outer sealing ring[, fit counter to the direction of through-flow] *and the housing*.

11. The aircraft-engine gas turbine according to claim 1, wherein the free axial path length of [each of] the [plurality of] *outer sealing* ring [segments] counter to the direction of through-flow is at least as large as an axial overhang of a radial mounting rail of the outer sealing ring.

12. The aircraft-engine gas turbine according to claim 1, wherein the free axial path length of [each of] the [plurality of] *outer sealing* ring [segments] counter to the direction of through-flow is at least as large as an axial offset of a sealing fin of [the outer sealing ring] *one rotor blade of the first array of rotor blades* counter to the direction of through-flow with respect to a downstream edge of a sealing face of each of the plurality of ring segments for sealing of the sealing fin.

[13. The method according to claim 6, wherein the free axial path length of each of the plurality of ring segments counter to the direction of through-flow is at least as large as an axial engagement of a rotation locking member of the outer sealing ring, fit counter to the direction of through-flow.]

[14. The method according to claim 6, wherein the free axial path length of each of the plurality of ring segments counter to the direction of through-flow is at least as large as an axial overhang of a radial mounting rail of the outer sealing ring.]

[15. The method according to claim 6, wherein the free axial path length of each of the plurality of ring segments counter to the direction of through-flow is at least as large as an axial offset of a sealing fin of the outer sealing ring counter to the direction of through-flow with respect to a downstream edge of a sealing face of each of the plurality of ring segments for sealing of the sealing fin.]

* * * * *